Jan. 4, 1966  C. E. FENLASON  3,226,800
METHOD OF MAKING A METAL EMBOSSING MATRIX
SUCH AS AN EMBOSSING ROLL
Filed Sept. 13, 1962  3 Sheets-Sheet 1
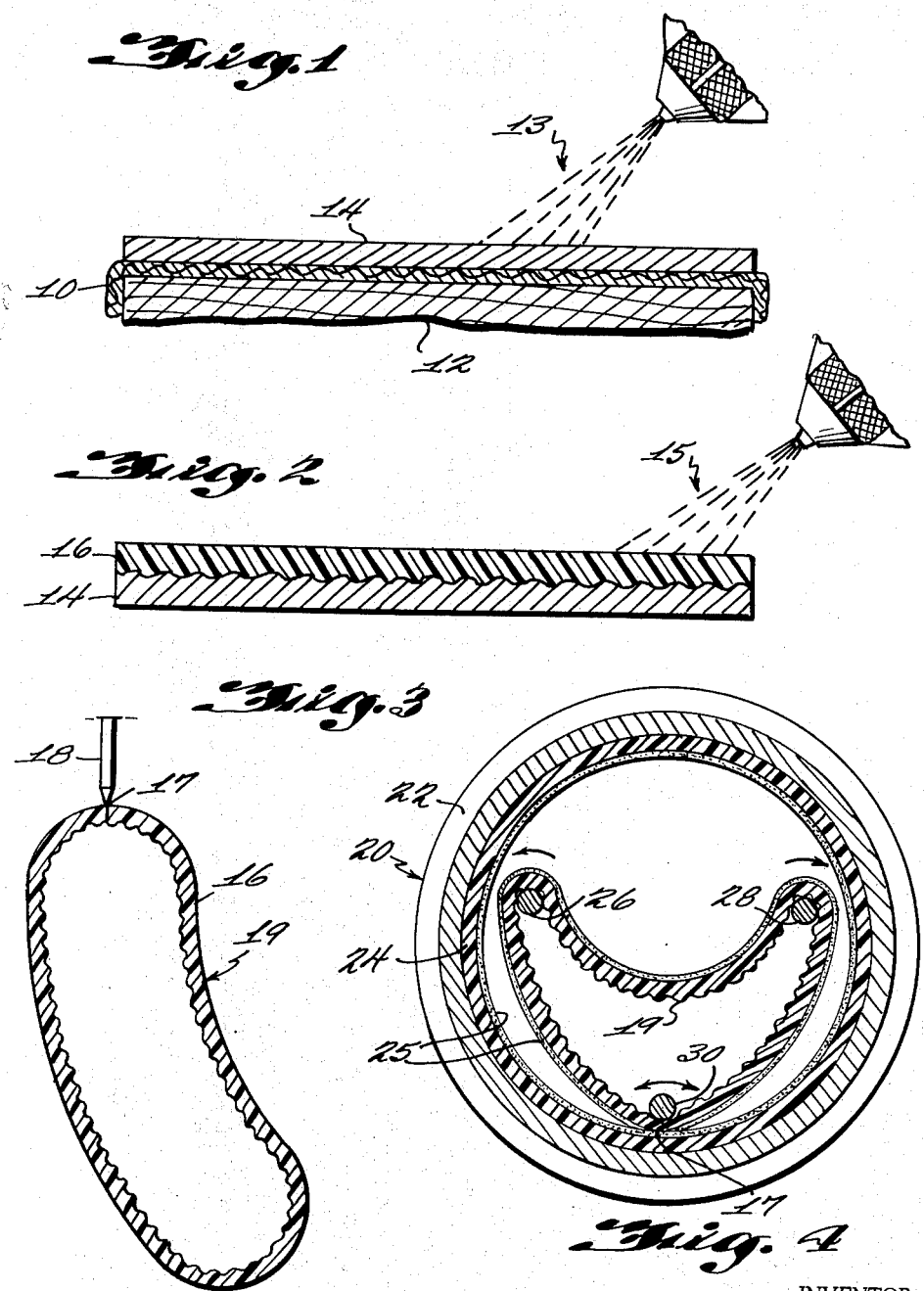
INVENTOR
CHARLES E. FENLASON
BY Cushman, Darby & Cushman
ATTORNEYS

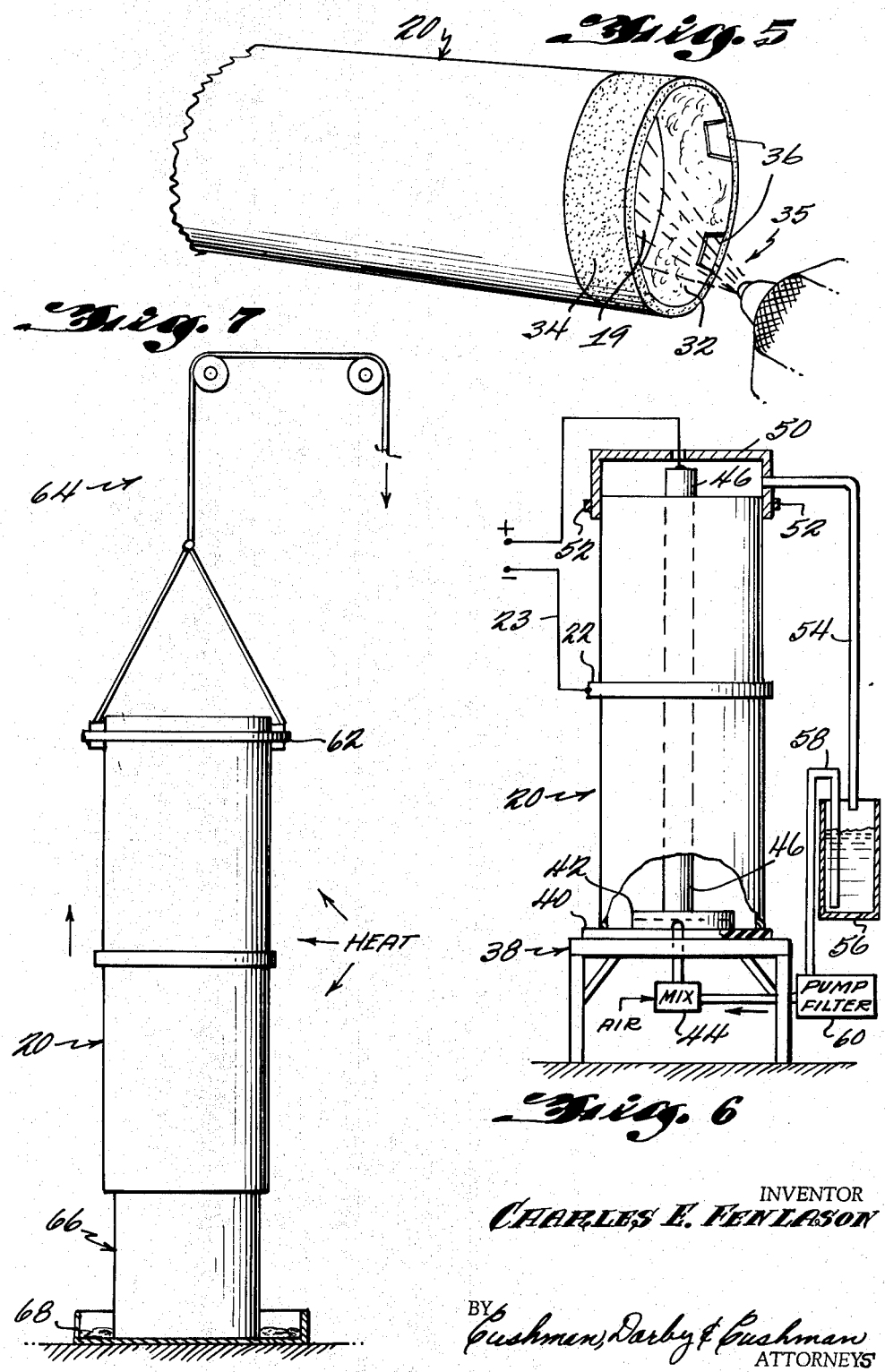

Jan. 4, 1966 C. E. FENLASON 3,226,800
METHOD OF MAKING A METAL EMBOSSING MATRIX
SUCH AS AN EMBOSSING ROLL
Filed Sept. 13, 1962 3 Sheets-Sheet 3
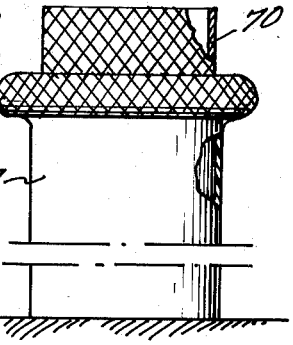
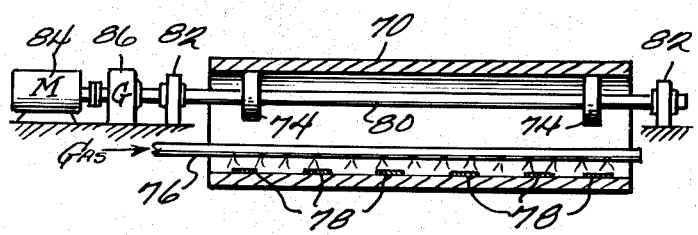
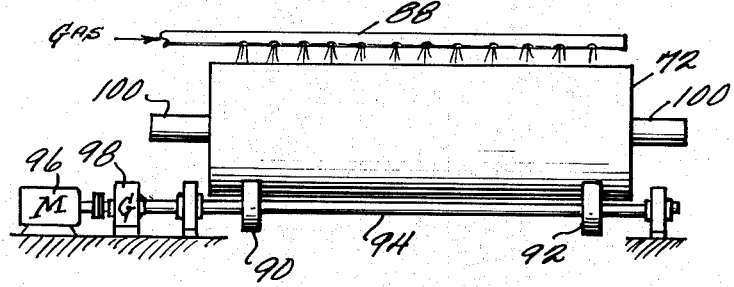
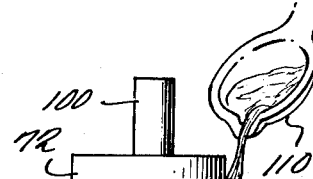
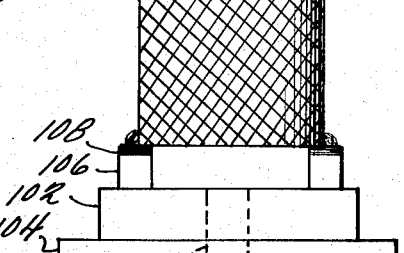
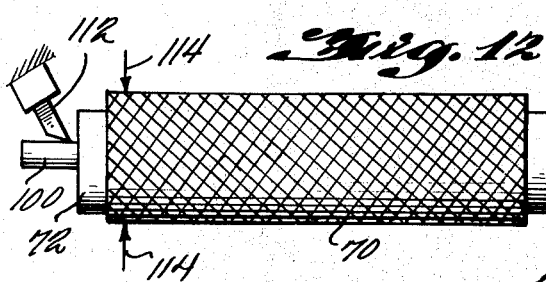
INVENTOR
CHARLES E. FENLASON
BY
Cushman, Darby & Cushman
ATTORNEYS United States Patent Office 3,226,800
Patented Jan. 4, 1966

3,226,800
METHOD OF MAKING A METAL EMBOSSING MATRIX SUCH AS AN EMBOSSING ROLL
Charles E. Fenlason, Pequannock, N.J.
(427 Highland Ave., South Plainfield, N.J.)
Filed Sept. 13, 1962, Ser. No. 223,360
19 Claims. (Cl. 29—148.4)

This invention relates to the manufacture of metal embossing matrices that have a given surface pattern or design reproduced therein with exceptional fidelity in every dimension from a master surface, and particularly to a method of accomplishing such high fidelity reproduction onto a metal matrix. The invention also relates to a process for making embossing cylinders or rolls having the aforesaid metal matrix with its high fidelity design.

It is an object of this invention to provide a method of making a metal embossing matrix or embossing roll from which plastic or other materials may be impressed with the design, produced onto the matrix from a master surface, to effect a reproduction so accurate and faithful in every detail that it is difficult to distinguish it by the eye alone from the master itself. The reproduction is so faithful that even "weavers' imperfections" are reproduced with exact fidelity, when the master involves cloth or the like. The reproduction is a "Chinese copy," so to speak. The invention has no limitations with respect to the type of design or pattern which the master may have. Any conventional design, or any new design imaginable, plus any pattern that is to be found in nature or made by man accidentially or intentionally, can be reproduced not only in looks, but also in topography and textural reflections. The matrix formable by this invention may reproduce, in a two- or three-dimensional configuration in accordance with the dimensions of the master from which the matrix is made, any design or pattern such as that found on the surface of wood, terrazzo, stone, slate, brick, tapestry, carpeting, buckskin, matting, straw cloth, crinkle foil, photographs, linoleum, wax, plaster, metal, glass, leather, reptile skin, leaves, arts creations, etc., ad infinitum, to name a few examples without limitation intended. Reproducing from the matrix may be such processes as compression molding, injection molding, vacuum forming, and embossing, and the material onto which the pattern of the matrix is reproduced may be plastic or metal according to the type of metal composing the matrix.

The method of this invention involves duplicating a master surface by use of a hardenable molten material, preferably metallic, which in solidifying absolutely does not shrink, but preferably even expands to push itself completely into every detail of the master surface to give the exceptional fidelity available by this invention. Such material may be applied to the master surface to be reproduced, by spraying, and the resultant product is a non-shrunk negative of the master. Therefrom a second but positive reproduction is made in a design-holding plastic. The plastic material utilized to make the positive is preferably flexible. It is then rigidized, and metal is plated onto its design side. This plating process electroforms the desired metal matrix with the master design exactly reproduced in its surface in negative. The matrix is readily separable from the plastic positive and it is rigidizing. In an embodiment wherein an embossing roll is to be made, the metal matrix is in the form of a hollow cylinder the outside surface of which has the design of interest. This hollow cylinder is then secured around a mandrel or cylinder of the type that has journals, and the journals are turned, if necessary, to make them concentric relative to the exterior surface of the hollow cylinder. Thereafter, the resultant embossing cylinder or roll may be ready to emboss materials with its design, though in some instances it may be desirable to make a mating, perfectly matched second roll from the first to allow embossing on both sides of the material being embossed.

This invention therefore provides for the production of embossing rolls having designs faithfully reproducing any desired master found in nature or created by man, without requiring any hand tooling by an artist. In the past, embossing rolls have been engraved by a mill and die method. In such a process, a short cylindrical roll is made into a female die with the design being produced therein mainly in accordance with the skill of a hand-tooling artist. Another roll of the same size as the die so-tooled is then made into a male roll or mill from the die by a resist-and-etch method, so as to have the desired pattern in relief on the mill. This mill is then rolled circumferentially over a long large cylinder, one circumferential strip after another, to produce a female embossing roll which is then hardened and from which a male embossing roll is made by a resist-etch process. From this explanation, it will be apparent that the accuracy of the design produced in the embossing rolls depends to a large extent on the ability of the hand tooler who makes the die. It is his job to copy or originally make the design of interest, and it is therefore apparent the design be tooled into a die, even with the aid of prior photo-engraving of the design outlines thereinto, cannot inevitably be an exact copy of the master.

It is therefore another object of this invention to provide a method of manufacturing embossing rolls with less time and expense than required by the prior art, and to provide a method which invariably will faithfully reproduce the surface of any type material, natural or artificial.

Other objects, advantages, and features of this invention will be made more apparent by the appended claims and the following detailed description read in conjunction with the drawings, in which:

FIGURE 1 shows making a non-shrunk negative,

FIGURE 2 shows making a plastic positive from that negative,

FIGURE 3 illustrates seaming and forming the plastic positive into a sleeve,

FIGURE 4 illustrates adhering the plastic sleeve to the interior surface of a prepared metal plating tube, FIGURE 5 ilustrates applying an electricaly conductive coating to the inside of the plating tube as covered by the plastic sleeve, FIGURE 6 shows apparatus including the plating tube for electroforming the metal matrix, FIGURE 7 illustrates the step of releasing the metal matrix from the plating tube, with the plastic sleeve still intact, FIGURE 8 shows the plastic sleeve being rolled off the cylindrical tube matrix, FIGURE 9 shows tinning the inside surface of the cylindrical matrix, FIGURE 10 illustrates tinning the outside surface of a mandrel, FIGURE 11 illustrates soldering the mandrel and cylindrical matrix together, and FIGURE 12 represents the step of turning the journals of the cylinder to be concentric with the external surface of the cylindrical matrix.

There is no particular limit to the type of surface and material making up that surface, which may be reproduced onto a metal matrix, such as a hollow cylinder that forms a shell of an embossing roll. Examples of different type of materials and patterns are stated above, and for purposes of the specific example now being described, it is assumed that the embossing roll to be made should contain and reflect the design and textural quality and three dimensional look of the surface of a piece of burlap. As the first step in the process, the burlap 10, with dimensions appropriate for the size of the embossing roll being made, is laid over a piece of plywood 12 of corresponding size and straightened so that the design pattern lines are not crooked, the edges of the cloth being then stapled or otherwise secured to the sides of the piece of plywood 12.

At this point, the burlap 10 has applied to it a hardenable molten material of the type that will not shrink but, if anything, expands or grows upon solidifying. Water has such a characteristic but is not especially suitable for this purpose. The prefered type of material has a metal base and preferably includes either bismuth or antimony, especially bismuth since it expands much more, in the nature of 3.3% of its volume when non-alloyed. When bismuth is alloyed with other materials such as lead, tin, cadmium, and indium, this expansion is modified according to the relative percentage of bismuth and other components present. As a general rule, bismuth alloys of approximately 50% bismuth exhibit little change in volume during solidification, while alloys containing more than this tend to expand, and those containing less tend to shrink, during solidification; but after solidification alloys containing both bismuth and lead in optimum proportions grow in the solid state many hours later. Bismuth alloys that do not contain lead expand during solidification, with negligible shrinkage while cooling to room temperature. A preferred material for use with this invention is marketed as "Cerrosafe," a registered trademark of the Cerro de Pasco Sales Corporation of New York City, for a non-eutectic alloy containing, by weight, bismuth 42.50%, lead 37.70%, tin 11.30%, cadmium 8.50%, which has a melting point of 165° F. This material shrinks slightly initially when it is applied, but by the time one hour has passed, it has grown back to its original volume and continues to expand thereafter. An expanding metal is desired, since in this way the metal will push itself, during expansion, into even the finest of details of the master surface, for example the burlap surface 10, so that when fully grown, the expanded metal will be a high fidelity reproduction of the master. This may be compared to low molten metals which when solidified shrink and pull away from the mold, failing to reproduce fine mold detail.

Preferably, as indicated in FIGURE 1 at 13, the metal mold material is sprayed from a molten state onto the master or burlap surface 10. As representative, but not critical, about 2½ lbs. of the molten material per square foot of pattern area being sprayed, may be used to give a thickness of about 3/16 inch to the resultant metal negative 14. As soon as the molten material solidifies and expands, it may be removed from the master surface 10. This can be conveniently accomplished by removing the staples holding the burlap to the plywood 12, so that the burlap may then be readily peeled off of the metal negative 14.

Then, as indicated in FIGURE 2, the non-shrunk metal negative 14 has applied to its design surface, i.e., its upper surface as reflected in FIGURE 2, a plastic material that results in a plastic positive 16. As indicated at 15, this plastic material may be sprayed onto the metal negative 14, and a representative thickness of the resultant plastic positive 16 is 0.030–0.035 inch, for example, no limitation being intended. Preferably, the plastic material 16 in vinyl plastisol which cures at a relatively low temperature, though any other plastic material that is flexible and will take and hold the design in question, may be employed. This includes polyethylene, rubber, wax, leather, linoleum, flexible wood, latex, and the like, to name but a few examples. When the plastic material has cured, it is stripped from the metal plate 14 and results as a flexible plastic positive of the design of the master surface.

Continuing with the specific example of producing an embossing roll, the plastic positive 16 is then properly cut and trimmed to desired length and width with the pattern properly aligned. Thereafter it is seamed, as indicated in FIGURE 3 at 17, for example by use of a heated needle 18, with the pattern surface being on the inside of the resultant sleeve 19. Generally, in the cutting of the plastic material before it is seamed, the pattern is cut for matching in the valleys of thinner areas of the material, since a join or seam 17 is less visible at this point. The face of the pattern is joined first so that pattern lines may be followed. Once the face is joined, the pattern is reversed and a greater heat is used to join the back since the strength of the joint come from there.

It is then necessary to rigidize sleeve 19 so that its inside surface can have metal plated onto it with as perfect concentricity as possible. To effect the rigidization, a steel tube 20 is employed. This tube is shown in cross section in FIGURE 4, and in elevation in FIGURE 6. The central rim 22 is for purposes of more easily attaching electrical conductor 23.

The installation of the plastic sleeve 16 into the steel plating tube 20 must be as concentric as possible. This roundness is achieved by spinning melted wax into tube 20 while the tube is revolving, and cooling the wax while the tube remains revolving. A layer of wax 24 is thereby concentrically coated on the inside surface of the tube. The thickness of wax layer 24 is predetermined by the difference in the radii of the inside surface of the tube and the outside surface of the sleeve while the sleeve is held in a circular condition. The sleeve radius may also be determined, of course, by measuring the outer circumference of the plastic sleeve. The wax used may be a mixture of six parts melted electrotypers molding wax to one part dry carnauba wax, by volume.

To effect this concentric coating of wax on the inside of the steel tube 20, of course the inside circumference of the tube itself must be reliably concentric with its chucking surfaces. With such a tube at hand, it is closed at one end with a cardboard disc which is taped in place, while the opposite end, where the melted wax is to be poured in, is closed by a tapped cardboard disc that has a hole cut out in the center. The tube is then turned in a lathe and heated to about 130° to about 140° F. before the wax is poured in. Then, the speed of the tube is increased to about 400 r.p.m. or about 900 f.p.m. of its outside diameter, and the wax poured in. As above indicated, the amount of wax poured into and spun onto the inside surface of the tube must be precalculated accurately to give a finished inside diameter which will correspond to the outside diameter of the plastic sleeve 19 to be inserted inside tube 20. After the wax has been poured in, the tube is allowed to rotate while cooling until the wax is set. This assures concentricity of the wax coating.

Before the plastic sleeve 19 is inserted into tube 20, preferably both the outside surface of the sleeve and the inside surface of the waxed tube are coated, as by brushing, with a pressure sensitive adhesive 25. The plastic sleeve, while still outside of tube 20, is then supported around two long metal rods 26 and 28 in a manner similar to that indicated in FIGURE 4, but with the droop of the U-shape of the upper side of sleeve 19 being more, and that of the lower side less than that depicted in FIGURE 4. At the far end of the rods, there may be disposed a wooden bracket (not shown) mounted on a castor so that the rods and plastic sleeve may be inserted into the interior of tube 20 by the castor running along the bottom inside coated surface of the tube. When the rods 26 and 28 fully extend into the tube so that sleeve 16 is properly positioned in a longitudinal sense relative to tube 20, the lower side of the sleeve is caused to droop more, while the upper side droops less, by rotating rods 26 and 28 simultaneously in the opposite directions indicated by the arrows above the rods in FIGURE 4. This places the lower side of the sleeve down adjacent the bottom of the coated inside periphery of tube 20. If the plastic sleeve 19 has a seam or joint 17, such as was produced in FIGURE 3 by the heated needle 18, the sleeve is rotated or otherwise caused to have this seam at the bottom so that it may be touched down first to the coated waxed area whereby any strain on the sleeve will be on unjoined areas. The sleeve is gradually forced against the coated wax surface 24 by rolling a roller 30 alternately to both sides of seam 17, progressively swinging the roller in a larger arc and making sure no air is being entrapped. It will be appreciated that a greater amount of sleeve surface is made available to contact wax layer 24, by turning rods 26 and 28 more in the directions indicated by the arrows. When the sleeve is about two-thirds to three-fourths rolled out, roller 30 will begin touching rods 26 and 28 in the extremities of its arcuate movement. At this time, rods 26 and 28 may be withdrawn, and tube 20 turned 180° so that the non-adhered side of the sleeve is now facing downward. Generally, this part of the sleeve will not fall down when the tube is so turned, but may remain in an inwardly arcing shape. Under such condition, the arc is gradually rolled down from each of its outer sides and finally over its hump to effect the complete adhering contact without air entrapment desired between the sleeve and waxed tube.

Once the tube is so adhered to the internal surface of the waxed tube, it will be appreciated that the sleeve is releasably mounted in the tube, since the wax layer is a meltable material which while melting will allow the sleeve to be separated from the tube. This is an important feature utilized following the subsequent plating of metal onto the interior surface of the sleeve, as will be more fully described below.

With the sleeve made rigid in the predetermined circular form dictated by the concentricity of the wax layer 24 and tube 20 itself, the forming of a metal layer on the inside surface of the sleeve, where the positive design of the master pattern occurs, may begin to proceed. First, as indicated in FIGURE 5, the interior surface 32 of each end of tube 20 from the tube end to the outer end of sleeve 19, along with the tube ends themselves and a two inch or so circumferential strip 34 on the outer surface of tube 20 contiguous to its ends, are coated with any desired substance that will protect these areas from the plating solution later mentioned, for example a coating of lacquer or wax. Several areas 36, for example four such areas spaced around the inside circumference of the tube on its surface 32 at each end, are either left free of such a coating, or have the coating removed down to the metal of tube 20, to act as electrodes for the electrically conductive coating that is sprayed, as indicated at 35, or otherwise applied to the complete inside surface of the sleeved and waxed tube. This conductive coating is generally a conductive silver, such as silver nitrate, sprayed on by the use of nitrogen to prevent any contamination which might carry through from the air compressor associated with the spray gun. Before silver spraying, a long handled brush may be used to scrub the interior of the plastic sleeve after a cleaning solution is sprayed thereonto, after which a spray of a sensitizing solution may precede the silver spraying.

With the tube coated with a conductive material on its inner surface, the electroforming of a hollow cylindrical metal matrix or embossing shell may proceed. Special apparatus, such as that shown in FIGURE 6, may conveniently be used in the electroforming process. The silvered tube 20 is vertically disposed on a plating stand 38 sealingly by virtue of rubber pad 40 and concentrically of the plating fluid (air and solution) dispenser 42. This dispenser has a central aperture in its bottom side, into which a predetermined mixture of air and plating solution flows from mixer 44, and from which flows that fluid via a plurality of grooves (for example, four, one in each 90° direction) located on the bottom surface of dispenser 42. After tube 20 is concentrically disposed about dispenser 42, a circular anode 46 is positioned concentrically of the interior surface of tube 20, or alternatively the anode is first centered on dispenser 42 before tube 20 is made concentric therewith. To the top of anode 42 is made a connection for current conductor 48, between which conductor and conductor 23 is selectively connected a source of D.C. current. Conductor 48 extends insulatively through a cap or bonnet 50, which leaves some head space at the top of tube 20, and which is clamped in any desirable manner about the top of tube 20, as by clamp 52. In the bonnet, at the very top of tube 20, is an overflow outlet connected by tube 54, preferably of clear plastic for viewing purposes, which empties into the exterior tank 56. The plating solution contained in this tank is forced upward from dispenser 42 between anode 46 and the cathodic tube 20, by being drawn via tube 58 by pump 60 with which is associated a filter. As previously indicated, the plating solution is mixed with a proper amount of air by mixer 44 before being dispensed as the plating fluid from dispenser 42.

The resulting hollow cylinder that is deposited onto the plastic sleeve on the inside surface of tube 20 is a metal of the kind dictated by the type of metal used for the anode and the plating solution. There is no particular limitation in this respect for the present invention, and the plating may be done with copper, nickel, iron, gold, silver, brass, chromium or any combination thereof, for example. Because of the ready ability of copper to tin during the assembly of the resultant shell with another cylinder to make an embossing roll, anode 46 is preferably of copper and the circulated solution and acid-copper plating solution made up, for example, by using seven ounces of sulfuric acid and thirty ounces of copper sulfate per gallon of solution. The plating bath is maintained at a constant temperature of about 90° F. with the use of electric immersion heaters (not shown) and air agitation is used during the plating or electroforming process. Initially, the current density during plating for the first 40 to 60 minutes may be about 15 to 20 amperes per square foot of pattern area, i.e., of plastic sleeve area. After this amount of time, the air agitation is turned off and the solution is lowered, so that the interior surface can be examined for defects and coverage. Small areas not covered may be touched up with collodial silver. Once a good pre-plate has been formed on the pattern, plating is resumed for a total of about 80 to 90 hours at a current density of approximately 20 amperes per square foot of pattern area. During this time, tube 20 is preferably inverted one or two, or perhaps three times, say at about the twentieth and sixtieth hour of plating, to ensure a more even layer of copper throughout the rest of the shell. Some patterns with more than average depth require an eight-hour period of reverse plating to achieve a more even layer in the finished copper shell. At the plating rate indicated, approximately 0.001 inch of copper is deposited per hour. From the above description of the electroforming process, it will be apparent that the method employed assures a continuous supply of fresh filtered solution in a free standing, tankless plating area, in an arrangement where there is no limitation on the size either in diameter or in height of the sleeved tube being plated. Plating by this method gives a highly accurate and even plating all around the inside surface of the sleeved tube, making for a uniform wall thickness of the resulting shell.

When the entire plating period is completed, the electroformed copper shell is ready to be removed from the steel tube. This may be accomplished in a manner similar to that illustrated in FIGURE 7. First, the plated tube 20 is removed from the plating stand and secured at its upper end, as by a circumferential clamp 62 to a hoisting arrangement 64. The bottom end of the tube is cleaned to allow free passage of the plastic sleeved copper shell when it starts to slide out as a unit. With the hoist, tube 20 is raised to a level of one or two inches from the floor so that the operator will know, by sight, when the sleeved copper shell 66 starts to slide out. A pan 68 is placed under the shell to catch the melted wax that flows down. To melt the wax, a gas torch (not shown) with a soft flame is placed on the outside surface of the steel tube to bring its temperature slightly above the melting point of the wax, care being exercised that there occurs no localized heating that would char or burn the plastic sleeve. After 10 or 15 minutes of such heating, the plastic sleeve, with the copper shell fully intact internally thereof, starts to drop. At this point tube 20 is raised by the overhead hoist until it is clear of the sleeve-shell combination. Any wax remaining on the outside of the plastic sleeve may then be scraped off, and the plastic sleeve is then peeled or stripped from the newly formed copper shell 70 (FIGURE 8), as by rolling sleeve 19 off thereof as shown in FIGURE 8.

At this point, the copper shell 70 is a metal matrix, which contains on its exterior surface the pattern or design of the master, but in negative. To make a complete embossing roll, it is necessary then to secure this copper shell to a journalled mandrel or other cylinder. Such may conveniently be done in accordance with the Nelson application, Serial No. 856,990, filed December 3, 1959, now Patent No. 3,042,996, granted July 10, 1962, and entitled "Embossy Shells and Method for Producing and Assembling Same." Another procedure is given below.

The inside surface of copper shell 70 is tinned as shown in FIGURE 9 before it is soldered around a tinned hollow steel cylinder or mandrel 72 (FIGURE 10). The tinning procedure of the hollow cylinder 70 in FIGURE 9 contemplates rotating the cylinder via its inside surface by a plurality of rollers 74, each having an appreciably smaller diameter than the inside diameter of that cylinder. During the rotation, a multiple flame gas torch 76 is inserted lengthwise of the cylinder to effect a fairly uniform heating thereof to a temperature of about 375° to about 400° F. to melt the several sticks 78 of three-in-one tinning sticks disposed at spaced points longitudinally along the bottom of the cylinder. The rotation and spreading of the melted solder tinning sticks effects a tinning of the entire inside area of the copper shell 70.

As may be appreciated from FIGURE 9, rollers 74 are fixedly secured to a shaft 80 that is turned in bearings 82 by a motor 84 connected thereto through a reduction gearing box 86, whereby shaft 80 is caused to rotate at a speed of from 6 to 12 r.p.m. for example. Gas may be introduced to torch 76 in any desirable manner to effect the necessary heating.

The mandrel or hollow cylinder 72 about which shell 70 is to be secured, has its outside surface tinned in a similar manner. As indicated in FIGURE 10, a gas flame torch 88 is used to heat the mandrel as it is rotated on a set of motorized horses, for example, two pairs of rollers 90 and 92. One roller in each pair is connected to a shaft 94 that is turned by motor 96 via reduction gear box 98 to cause the mandrel to revolve at a slow rate, for example 10 r.p.m. When the complete mandrel has reached a temperature of say 500° F., solder and flux are rubbed against the steel surface of the mandrel until it is completely tinned.

As will be noted in FIGURE 10, mandrel 72 has previously been equipped with journals 100 at its opposite ends, and it might be added that the mandrel is of course pre-turned to a diameter less than the inside diameter of the copper shell 70, for example from 0.03 to 0.050 inch less.

The tinned mandrel 72 then has one of its journals set in a chuck 102 (FIGURE 11), which has been mounted on a steel spider 104, to hold the mandrel in a vertical position. A clamping device 106, which will both support the copper shell at the proper height and hold asbestos paste 108 to prevent leakage of solder, is secured around the lower part of mandrel 72, next to chuck 102. The copper shell 70 is then lowered over the top of mandrel 72 until it settles firmly into the asbestos paste 108. Of course, clamping device 106 and asbestos paste 108 are pre-dimensioned in a longitudinal sense to effect proper positioning of shell 70 longitudinally of mandrel 72. When the shell is settled on the asbestos paste, more asbestos paste is packed around the bottom outside edge of the copper shell, and melted solder, for example 50% tin and 50% lead, is poured from ladle 110 into the annular space between the copper shell 70 and mandrel 72. During this time, the mandrel should remain above 450° F. or so, so that no additional heating is necessary on the copper shell for completing the filling with solder. The solder may perhaps settle somewhat at the top when cooling, and should therefore be watched and refilling accomplished as necessary to assure complete pouring. Before cooling is complete, the copper shell should be tapped lightly with a wooden handle or the like to make sure no air pockets exist between the shell and mandrel. When cooled, the resultant embossing roll is ready for machining.

The machining contemplated involves, as indicated in FIGURE 12, concentrically cutting journals 100, one after the other while the opposite journal is being rotatively held in bearing 111, with tool 112 with respect to the exterior surface of shell 70 as indicated by arrows 114. This trues the complete roll to the patterned peripheral surface, so that the roll will be concentric during use in embossing strips of material.

After the embossing roll is thereby made concentric, it may be effectively hardened for longer life, by depositing over the copper shell a thin layer of hard chrome, say, 0.0006-inch thick. This will not "clog" the pattern but instead its exceptional fidelity will be retained.

When the finished roll is to be used in embossing plastic or the like when a heating or cooling problem may be involved, mandrel 72 is a hollow cylinder with steam or coolant access thereto through threaded apertures in its journals 100.

Much of the embossing of plastics, or plastic-faced materials, is done with a single embossing roll, but some of the most striking effects in embossing can be achieved by the use of twin, perfectly matched rolls, one male and the other female. If it is desired to make a mated pair of embossing rolls, a male roll may be made from the hardened female roll of FIGURE 12, by a conventional process such as that fully described in the Sunderhauf et al. Patent 2,662,002.

If the master to be reproduced onto a metal matrix is itself a satisfactory flexible sleeve, or can be made into such as by seaming, then of course the earlier steps above described need not be accomplished and the process according to this invention would then start with the subsequent steps required to plate metal onto the interior of the sleeve.

The process of this invention as above described may be employed to make embossing rolls of any diameter and length desired. Whether the rolls are large or small, and some exceed 14 feet in length and 20 inches in diameter, and whether the rolls are used by themselves, or with a mating roll, it is apparent that by this invention they are works of art, super-precise reproductions of any desired master surface. Thus, the objects and advantages herein indicated have been successfully achieved by this invention.

One of ordinary skill in the art will appreciate, after reading this disclosure, that variations in the procedure may be made without departing from the spirit and scope of this invention, as defined by the following claims.

What is claimed is:

1. A method of making a metal embossing matrix with a design conforming with great fidelity in every dimension to that in and on any desired master surface comprising separating from said master surface a non-shrunk reproduction thereof, making from said reproduction a second reproduction in a design-holding plastic, plating metal onto the design side of said second reproduction, and separating the plated metal therefrom to obtain said metal matrix.

2. A method as in claim 1 wherein said non-shrinking molten material expands while on said master surface to reproduce every minute detail of the design therein and on.

3. A method as in claim 2 wherein the making of said positive includes applying a vinyl plastisol to said non-shrunk negative, curing the applied plastisol, and removing from said non-shrink negative the cured plastisol as the said flexible design-holding plastic positive.

4. A method as in claim 2 wherein rigidizing the said positive into predetermined form includes seaming the positive into a sleeve with the said design side inwardly and releasably mounting said sleeve outside surface to inside surface of a metal plating tube.

5. A method as in claim 4 wherein said plating includes electroforming a metal cylinder on the inside surface of said sleeve, the method thereafter including releasing said sleeve, and intact therewith the said cylinder, from said tube, followed by the aforesaid separating step to remove the sleeve from around the said cylinder to expose its exterior surface with the aforesaid design thereon in negative.

6. A process of manufacturing an embossing roll including the method of claim 5 wherein said cylinder is hollow, and further including securing the hollow cylinder around a solid cylinder that has journals and causing the journals to be concentric with the exterior surface of said hollow cylinder.

7. A process as in claim 6 wherein the securing of said cylinders together includes tinning the entire inner surface of said hollow cylinder which comprises rotating the hollow cylinder while exposing its inner surface to flame heat and melting solder bars disposed along the length of its said inner surface.

8. A method as in claim 4 wherein, the step of releasably mounting said sleeve in said tube includes concentrically dispersing a meltable material over the inside surface of said tube in a measured amount corresponding to the difference in inside and outside diameters respectively of said tube and sleeve, applying adhesive to at least one of the surfaces of the so-modified tube and sleeve to be mounted together, and adheringly contacting those surfaces, the said method further including, after the aforesaid plating, melting the said meltable material and slidingly removing said sleeve, and interiorly intact therewith the plated metal in the form of a hollow cylinder, from said tube, the aforesaid step of separating the plated metal and positive including removing said sleeve from around said hollow cylinder to expose the said design in negative on its exterior surface.

9. A method as in claim 8 wherein said meltable material is wax.

10. A method as in claim 9 wherein the wax dispersing step includes spinning said tube concentrically while introducing and solidifying hot wax onto its said inside surface.

11. A process for manufacturing an embossing roll including the method of claim 8 and further including securing said hollow cylinder around a solid cylinder that has journals and causing the journals to be concentric with the exterior surface of said hollow cylinder.

12. A process as in claim 11 wherein the said securing of said cylinders includes tinning the inside and outside surfaces respectively of said hollow and soild cylinders, mating the cylinders, and pouring solder between them.

13. A method as in claim 8 including coating the inside surface of said sleeve and tube, after the sleeve is mounted therein, with electrically conductive material making electrical contact with said tube at at least one end thereof.

14. A method as in claim 8 wherein the outer surface of said sleeve and the inner surface of said meltable material are adheringly contacted by first droopingly supporting said sleeve around two rods within said tube and then rollingly forcing the sleeve seam first gradually against the inner surface of said meltable material alternately to opposite sides of said seam while rotating said rods in opposite directions to supply more contactable sleeve surface.

15. A method of making a metal embossing matrix with a design in negative conforming with great fidelity in every dimension to that in and on any desired master surface comprising the steps of solidifying on said master surface an applied, effectively non-shrinking molten material, separating the solidified material from said master surface to obtain a non-shrunk negative of said design, making from said non-shrunk negative a separate flexible design-holding plastic positive of said design, rigidizing said positive into predetermined form, plating metal onto the design side of said rigidized positive, and separating the plated metal and said positive to obtain the said metal matrix in the said predetermined form with said design in negative.

16. A method as in claim 15 wherein said molten material is metallic.

17. A method as in claim 16 wherein said metallic material is selected from the group consisting of antimony and bismuth.

18. A method as in claim 17 wherein said metallic material is a bismuth alloy.

19. A method as in claim 18 wherein said alloy includes lead.

References Cited by the Examiner

UNITED STATES PATENTS

| | | | |
|---|---|---|---|
| 412,759 | 10/1889 | Keep | 22—195 |
| 1,868,788 | 7/1932 | Zinser | 76—107 X |
| 3,018,540 | 1/1962 | Chavannes | 29—148.4 |
| 3,065,511 | 11/1962 | Leitzel | 22—195 |

WHITMORE A. WILTZ, *Primary Examiner*.

THOMAS H. EAGER, *Examiner*.